(12) United States Patent
Lu et al.

(10) Patent No.: US 10,671,447 B2
(45) Date of Patent: *Jun. 2, 2020

(54) METHOD, APPARATUS, AND NETWORK-ON-CHIP FOR TASK ALLOCATION BASED ON PREDICTED TRAFFIC IN AN EXTENDED AREA

(71) Applicant: Huawei Technologies Co., Ltd., Shenzhen, Guangdong (CN)

(72) Inventors: Hang Lu, Beijing (CN); Yinhe Han, Beijing (CN); Binzhang Fu, Beijing (CN); Xiaowei Li, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 123 days.

This patent is subject to a terminal disclaimer.

(21) Appl. No.: 15/943,370

(22) Filed: Apr. 2, 2018

(65) Prior Publication Data

US 2018/0225156 A1    Aug. 9, 2018

Related U.S. Application Data

(63) Continuation of application No. 14/940,577, filed on Nov. 13, 2015, now Pat. No. 9,965,335, which is a (Continued)

(30) Foreign Application Priority Data

May 14, 2013    (CN) .......................... 2013 1 0177172

(51) Int. Cl.
  *G06F 9/46*    (2006.01)
  *G06F 9/50*    (2006.01)
  *G06F 15/78*   (2006.01)

(52) U.S. Cl.
  CPC .......... *G06F 9/5088* (2013.01); *G06F 9/5066* (2013.01); *G06F 15/7825* (2013.01)

(58) Field of Classification Search
  None
  See application file for complete search history.

(56) References Cited

U.S. PATENT DOCUMENTS 8,719,821 B2    5/2014    Imade
9,201,694 B2   12/2015    Shimamura
(Continued)

FOREIGN PATENT DOCUMENTS

CN    101403982 A    4/2009
CN    102193779 A    9/2011
(Continued)

OTHER PUBLICATIONS

Solheim et al.; "A Framework for Routing and Resource Allocation in Network Virtualization"; 2009 International Conference on High Performance Computing (HiPC); Kochi, India; Dec. 16-19, 2009; 11 pages.

(Continued)

*Primary Examiner* — Wissam Rashid
(74) *Attorney, Agent, or Firm* — Womble Bond Dickinson (US) LLP

(57) ABSTRACT

A task allocation method, a chip are disclosed. The method includes: determining the number of threads included in a to-be-processed task; determining, in a network-on-chip formed by a multi-core processor, a continuous area formed by routers-on-chip corresponding to multiple continuous idle processor cores whose number is equal to the number of the threads; when the area is a non-rectangular area, determining an extended area extended from the non-rectangular area; and when predicted traffic of each router-on-chip that is connected to a processor core in the extended area does (Continued)

not exceed a preset threshold, allocating the multiple threads of the to-be-processed task to the idle processor cores in the non-rectangular area. According to the task allocation method provided in the embodiments of the present invention, problems of large hardware overheads, a low network throughput, low system utilization are avoided.

18 Claims, 8 Drawing Sheets

Related U.S. Application Data continuation of application No. PCT/CN2014/075655, filed on Apr. 18, 2014.

(56) References Cited

U.S. PATENT DOCUMENTS

| | | | |
|---|---|---|---|
| 2009/0328047 A1 | 12/2009 | Li et al. | |
| 2011/0219382 A1 | 9/2011 | Hou | |
| 2012/0216064 A1 | 8/2012 | Ko et al. | |

FOREIGN PATENT DOCUMENTS

| | | |
|---|---|---|
| CN | 102541633 A | 7/2012 |
| JP | 2007206987 | 8/2007 |
| JP | 2007206987 A | 8/2007 |
| JP | 2008191949 | 8/2008 |
| JP | 2008191949 A | 8/2008 |
| JP | 2012243223 | 12/2012 |
| JP | 2012243223 A | 12/2012 |
| KR | 20120095507 | 8/2012 |
| KR | 20120095507 A | 8/2012 |
| WO | 2012/020474 | 2/2012 |
| WO | 2012020474 A1 | 2/2012 |

OTHER PUBLICATIONS

Solheim et al.; "Routing-Contained Virtualization Based on Up*/Down* Forwarding"; 14th International Conference on High Performance Computing—HiPC 2007; Goa, India; Dec. 18-21, 2007; 14 pages.
Flich et al.; "On the Potential of NoC Virtualization for Multicore Chips"; 2008 International Conference on Complex, Intelligent and Software Intensive Systems; Barcelona, Spain; Mar. 4-7, 2008; 7 pages.
Gupta et al.; "A Flexible Processor Allocation Strategy for Mesh Connected Parallel Systems"; Proceedings of the 1996 International Conference on Parallel Processing; Ithaca, New York, USA; Aug. 12-16, 1996; 8 pages.
Lu et al.; "RISO: Relaxed Network-on-Chip Isolation for Cloud Processors"; DAC'13; Austin, Texas, USA; May 29-Jun. 7, 2013; 6 pages.
Liao et al.; "A Scalable Strategy for Runtime Resource Management on NoC based Manycore Systems"; 13th International Symposium on Integrated Circuits (ISIC); Singapore, Singapore; Dec. 12-14, 2011; 4 pages.
Daoud et al.; "Processor Allocation Algorithm based on Frame Combing with Memorization for 2D Mesh CMPs"; 2012 IEEE Third Latin American Symposium on Circuits and Systems (LASCAS); Playa del Carmen, Mexico; Feb. 29-Mar. 2, 2012; 4 pages.
Singh et al.; "Communication-aware heuristics for run-time task mapping on NoC-based MPSoC platforms"; Journal of Systems Architecture; vol. 56, No. 7; Jul. 2010; 14 pages.
Asadinia et al.; "Supporting non-contiguous processor allocation in mesh-based chip multiprocessors using virtual point-to-point links"; IET Computers and Digital Techniques; vol. 6, Iss. 5; Sep. 2012; 16 pages.
Huang et al.; "Application-Driven End-to-End Traffic Predictions for Low Power NoC Design"; IEEE Transactions on Very Large Scale Integration Systems; vol. 21, Iss. 2; Feb. 2013; 10 pages.
Seo et al.; "Improving system performance in contiguous processor allocation for mesh-connected parallel systems"; The Journal of Systems and Software; vol. 67; 2003; 10 pages.
Vipul Gupta, et al., "A Flexible Processor Allocation Strategy for Mesh Connected Parallel Systems", 1996 International Conference on Parallel Processing, 1996, p. 166-173.
Ashild G. Solheim, et al., "A Framework for Routing and Resource Allocation in Network Virtualization", IEEE, 2009, p. 129-139.
J. Flich, et al., "On the Potential of NoC Virtualization for Multicore Chips", International Conference on Complex, Intelligent and Software Intensive Systems, 2008, p. 801-807.
Ashild G. Solheim, et al., "Routing-Contained Virtualization Based on Up*/Down* Forwarding", 2007, p. 500-513.
M. Asadinia, et al., "Supporting non-contiguous processor allocation in mesh-based chip multiprocessors using virtual point-to-point links", IET Computers and Digital Techniques, vol. 6 Issue 5, Sep. 1, 2012, p. 302-317.
Amit Kumar Singh, et al., "Communication-aware heuristics for run-time task mapping on NoC-based MPSoC platforms", Journal of Systems Architecture, vol. 56, No. 7, Jul. 1, 2010, p. 242-255.
Xiongfei Liao, et al., "A Scalable Strategy for Runtime Resource Management on NoC based Manycore Systems", IEEE, Dec. 12, 2011, p. 297-300.
Luka B. Daoud, et al., "Processor Allocation Algorithm based on Frame Combing with Memorization for 2D Mesh CMPs", IEEE, Feb. 29, 2012, 4 pages.
Hang Lu, et al., "RISO: Relaxed Network-on-Chip Isolation for Cloud Processors", Design Automation Conference, May 29-Jun. 7, 2013, 6 pages.
Huang et al., Application-driven End-to-End Traffic Predictions for Low Power NoC Design, IEEE Transactions on Very Large Scale Integration, vol. 21, No. 2, Feb. 2013.
Seo et al., Improving System Performance in Contiguous Processor Allocation for Mesh-Connected Parallel Systems, 2002, Elsevier Science Inc.

METHOD, APPARATUS, AND NETWORK-ON-CHIP FOR TASK ALLOCATION BASED ON PREDICTED TRAFFIC IN AN EXTENDED AREA

CROSS-REFERENCE TO RELATED APPLICATIONS

This application is a continuation of U.S. patent application Ser. No. 14/940,577 filed on Nov. 13, 2015, which is a continuation of International Application No. PCT/CN2014/075655 filed on Apr. 18, 2014, which claims priority to Chinese Patent Application No. 201310177172.1 filed on May 14, 2013. All of the afore-mentioned patent applications are hereby incorporated by reference in their entireties.

TECHNICAL FIELD

Embodiments of the present invention relate to multi-core network-on-chip technologies, and in particular, to a task allocation method, a task allocation apparatus, and a network-on-chip.

BACKGROUND

As an integration level of very large scale integrated circuits (Very Large Scale Integration, VLSI for short) becomes higher, more on-chip processing units, such as a storage unit and a signal processing unit, are integrated on a same chip, each on-chip processing unit is equivalent to one processor core, and multiple processor cores form a multi-core processor or a many-core processor. A network-on-chip (Network-on-Chip, NoC for short) is a main means for implementing data transmission between different processor cores in the multi-core processor. As the number of the processor cores becomes larger, a situation in which multiple threads of one task and multiple tasks are simultaneously operated in a same processor core is increasingly common; if threads of different tasks are randomly allocated to some processor cores, in the NoC, communication between processor cores operating different threads of a same task is affected by data streams of other tasks; in this case, quality of service (Quality of Service, QoS for short) cannot be ensured, and system performance is lowered. In order to avoid mutual interference of data streams between tasks caused by randomly allocating tasks in the NoC, a subnet division method is usually used, that is, data streams belonging to a same task are limited in a specific area of the NoC.

In the prior art, a routing table is established for each router-on-chip in the NoC, and the routing table determines a routing mechanism of transmitting a packet from a source router-on-chip to a destination router-on-chip. When subnet division is performed, it is ensured by using an internal routing algorithm that a router-on-chip that a next hop of a data stream of one task reaches is a router-on-chip allocated to a same task, and the routing algorithm is applicable to any topology, is relatively complicated, and has large hardware overheads, and a subnet in an irregular shape easily generates traffic congestion. FIG. 1 is a schematic diagram of a task allocation method based on a routing algorithm in the prior art. As shown in FIG. 1, if all other routers-on-chip in a task 5 need to communicate with a Dest, a same link needs to be used, which may cause link congestion, and affect a network throughput.

SUMMARY

Embodiments of the present invention provide a task allocation method, a task allocation apparatus, and a network-on-chip, which are used to solve a problem in the prior art that hardware overheads are large, a network throughput is low, and so on in a task allocation method based on a routing algorithm.

According to a first aspect, an embodiment of the present invention provides a task allocation method, including:

determining the number of threads included in a to-be-processed task;

determining, in a network-on-chip formed by a multi-core processor, multiple continuous idle processor cores whose number is equal to the number of the threads, where each of the idle processor cores is connected to one router-on-chip;

searching for and determining, in the network-on-chip if an area formed by the determined routers-on-chip connected to the idle processor cores is a non-rectangular area, a rectangular area extended from the non-rectangular area; and allocating the threads of the to-be-processed task to the idle processor cores if predicted traffic of each router-on-chip that is connected to a non-idle processor core and in the extended rectangular area does not exceed a preset threshold, where each of the idle processor cores is allocated one thread.

In a first possible implementation manner of the first aspect, the rectangular area extended from the non-rectangular area is a smallest rectangular area including the non-rectangular area in the network-on-chip.

With reference to the first aspect or the first possible implementation manner of the first aspect, in a second possible implementation manner of the first aspect, after the determining, in a network-on-chip formed by a multi-core processor, multiple continuous idle processor cores whose number matches the number of the threads, the method further includes:

if the area formed by the determined routers-on-chip of the idle processor cores is a rectangular area, allocating the threads of the to-be-processed task to the idle processor cores respectively, where each of the processor cores is allocated one thread.

With reference to any one of the first aspect, the first possible implementation manner of the first aspect, and the second possible implementation manner, in a third possible implementation manner, the network-on-chip includes multiple processor cores arranged in a row-column manner; and correspondingly, the determining, in a network-on-chip formed by a multi-core processor, multiple continuous idle processor cores whose number matches the number of the threads includes:

determining an initial idle processor core in the network-on-chip formed by the multi-core processor; and determining, in the network-on-chip formed by the multi-core processor and by using the initial idle processor core as a start point, the multiple continuous idle processor cores whose number matches the number of the threads.

With reference to the third possible implementation manner of the first aspect, in a fourth possible implementation manner of the first aspect, the searching for and determining, if an area formed by the determined routers-on-chip of the idle processor cores is a non-rectangular area, a rectangular area extended from the non-rectangular area includes:

successively determining, along an adjacent router-on-chip in a same row of a router-on-chip connected to the initial idle processor core, whether the multiple continuous idle processor cores whose number matches the number of the threads exist; and if the number of continuous processor cores, successively determined along the adjacent router-on-chip in the same row, in a first idle area does not match the number of the threads, successively determining a continuous second idle area along an adjacent router-on-chip in a same column of the router-on-chip connected to the initial idle processor, so that a sum of the number of the processor cores in the first idle area and the number of processor cores in the second idle area is equal to the number of the threads.

With reference to the third possible implementation manner of the first aspect, in a fourth possible implementation manner of the first aspect, the searching for and determining, if an area formed by the determined routers-on-chip of the idle processor cores is a non-rectangular area, a rectangular area extended from the non-rectangular area includes:

successively determining, along an adjacent router-on-chip in a same column of a router-on-chip connected to the initial idle processor core, whether the multiple continuous idle processor cores whose number matches the number of the threads exist; and if the number of continuous processor cores, successively determined along the adjacent router-on-chip in the same column, in a third idle area does not match the number of the threads, successively determining a continuous fourth idle area along an adjacent router-on-chip in a same row of the router-on-chip connected to the initial idle processor core, so that a sum of the number of the processor cores in the third idle area and the number of processor cores in the fourth idle area is equal to the number of the threads.

With reference to the first aspect and any possible implementation manner of the first to fifth possible implementation manners of the first aspect, in a sixth possible implementation manner of the first aspect, before the, allocating the threads included in the to-be-processed task to the idle processor cores respectively if predicted traffic of each router-on-chip that is connected to a non-idle processor core and in the rectangular area does not exceed a preset threshold, the method further includes:

predicting, according to historical traffic information of the router-on-chip that is connected to the non-idle processor core and in the rectangular area, traffic of the router-on-chip that is connected to the non-idle processor core and in the rectangular area, to obtain the predicted traffic.

According to a second aspect, an embodiment of the present invention provides a task allocation apparatus, including:

a first determining module, configured to determine the number of threads included in a to-be-processed task;

a second determining module, configured to determine, in a network-on-chip formed by a multi-core processor, multiple continuous idle processor cores whose number is equal to the number of the threads, where each of the idle processor cores is connected to one router-on-chip;

a third determining module, configured to: when an area formed by the routers-on-chip that are determined by the second determining module and connected to the idle processor cores is a non-rectangular area, search for and determine, in the network-on-chip, a rectangular area extended from the non-rectangular area; and an allocation module, configured to: if predicted traffic of each router-on-chip that is connected to a non-idle processor core and in the rectangular area determined by the third determining module does not exceed a preset threshold, allocate the threads of the to-be-processed task to the idle processor cores, where each of the idle processor cores is allocated one thread.

In a first possible implementation manner of the second aspect, the third determining module is specifically configured to:

determine that the rectangular area extended from the non-rectangular area is a smallest rectangular area including the non-rectangular area in the network-on-chip.

With reference to the second aspect and the first possible implementation manner of the second aspect, in a second possible implementation manner of the second aspect, the allocation module is further configured to:

if the routers-on-chip that are determined by the second determining module and connected to the multiple idle processor cores form a rectangular area, allocate the threads of the to-be-processed task to the idle processor cores respectively, where each of the processor cores is allocated one thread.

With reference to the second aspect and either possible implementation manner of the first and second possible implementation manners of the second aspect, in a third possible implementation manner of the second aspect, the second determining module is specifically configured to:

determine an initial idle processor core in the network-on-chip formed by the multi-core processor, where the network-on-chip includes multiple processor cores arranged in a row-column manner; and determine, in the network-on-chip formed by the multi-core processor and by using the initial idle processor core as a start point, the multiple continuous idle processor cores whose number matches the number of the threads.

With reference to the third possible implementation manner of the second aspect, in a fourth possible implementation manner of the second aspect, the second determining module is specifically configured to: successively determine, along an adjacent router-on-chip in a same row of a router-on-chip connected to the initial idle processor core, whether the multiple continuous idle processor cores whose number matches the number of the threads exist; and if the number of continuous processor cores, successively determined along the adjacent router-on-chip in the same row, in a first idle area does not match the number of the threads, successively determine a continuous second idle area along an adjacent router-on-chip in a same column of the router-on-chip connected to the initial idle processor, so that a sum of the number of the processor cores in the first idle area and the number of processor cores in the second idle area is equal to the number of the threads.

With reference to the third possible implementation manner of the second aspect, in a fifth possible implementation manner of the second aspect, the second determining module is specifically configured to:

successively determine, along an adjacent router-on-chip in a same column of a router-on-chip connected to the initial idle processor core, whether the multiple continuous idle processor cores whose number matches the number of the threads exist; and if the number of continuous processor cores, successively determined along the adjacent router-on-chip in the same column, in a third idle area does not match the number of the threads, successively determine a continuous fourth idle area along an adjacent router-on-chip in a same row of the router-on-chip connected to the initial idle processor core, so that a sum of the number of the processor cores in the third idle area and the number of processor cores in the fourth idle area is equal to the number of the threads.

With reference to the second aspect and any possible implementation manner of the first to fifth possible implementation manners of the second aspect, in a sixth possible implementation manner of the second aspect, the task allocation apparatus further includes:

a prediction module, configured to predict, according to historical traffic information of the router-on-chip that is connected to the non-idle processor core and in the rectangular area, traffic of the router-on-chip that is connected to the non-idle processor core and in the rectangular area, to obtain the predicted traffic.

According to a third aspect, an embodiment of the present invention further provides a network-on-chip, including multiple processor cores, routers-on-chip, and interconnections, and the task allocation apparatus described in any one of the foregoing possible implementation manners.

According to the task allocation method, the task allocation apparatus, and the network-on-chip provided in the embodiments of the present invention, the number of threads included in a to-be-processed task is determined; a non-rectangular area formed by multiple idle processor cores whose number matches the number of the required threads is determined in a network-on-chip, and an edge router-on-chip adjacent to the non-rectangular area and routers-on-chip that are connected to the idle processor cores and in the non-rectangular area form a regular rectangular area; a router-on-chip that is connected to a non-idle processor core and in the rectangular area is then determined, that is, whether traffic of the edge router-on-chip exceeds a preset threshold; and if the traffic of the edge router-on-chip does not exceed the preset threshold, the to-be-processed task is allocated to a processor core in an idle area. According to the task allocation method provided in the embodiments of the present invention, when the number of idle processor core resources in the network-on-chip is equal to or greater than the number of processor cores required by the to-be-processed task, if there is no regular rectangular area to which the to-be-processed task is allocated, the non-rectangular area forms the regular rectangular area by using the edge router and the to-be-processed task is allocated; in the rectangular area, a routing mechanism of a packet from a source router-on-chip to a destination router-on-chip does not need to be determined by using a routing table, and the packet is transmitted in an XY routing manner, thereby avoiding network congestion, and improving a network throughput.

BRIEF DESCRIPTION OF THE DRAWINGS

To describe the technical solutions in the embodiments of the present invention more clearly, the following briefly introduces the accompanying drawings required for describing the embodiments.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention.

Figure 1:
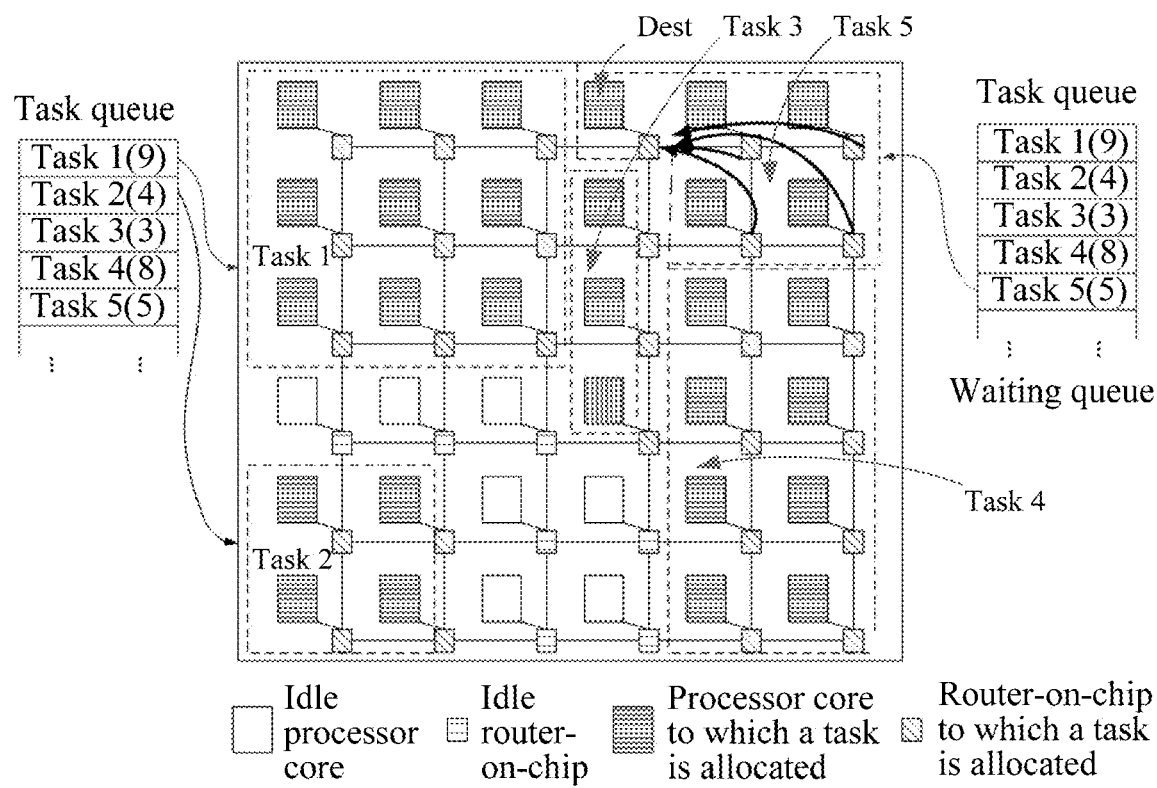
FIG. 1 is a schematic diagram of a task allocation method based on a routing subnet in the prior art.
Figure 2:
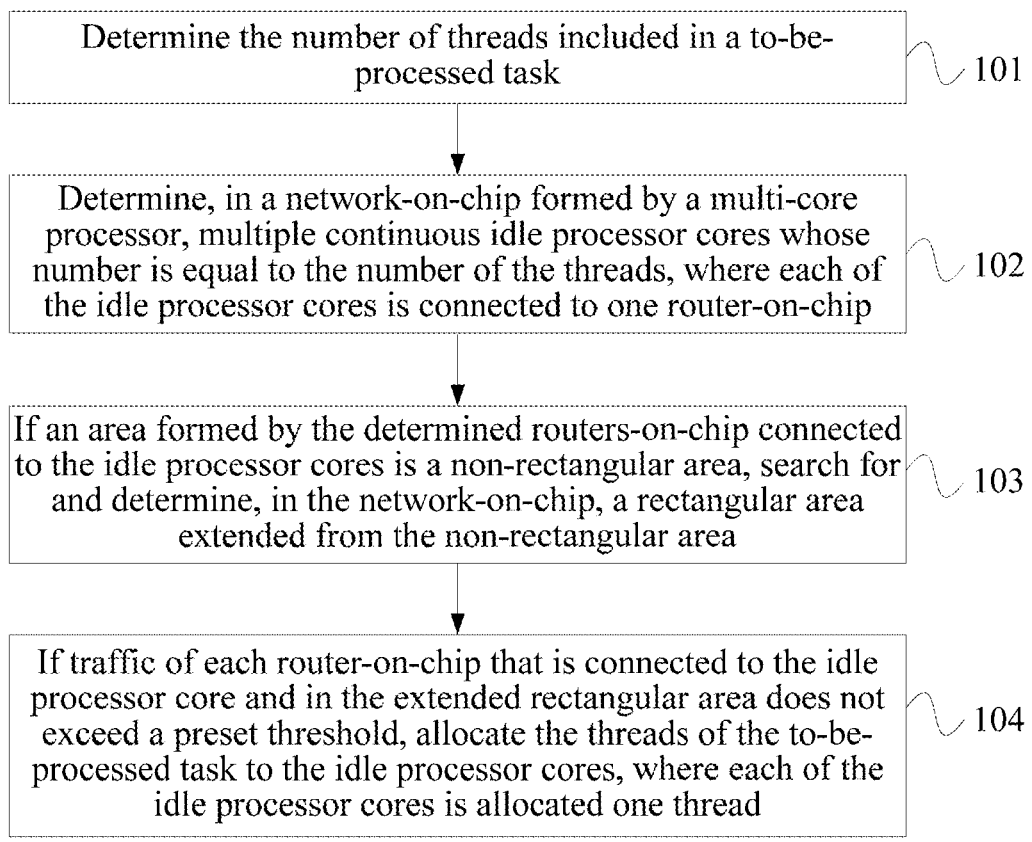
FIG. 2 is a flowchart of Embodiment 1 of a task allocation method according to the present invention.

FIG. 2 is a flowchart of Embodiment 1 of a task allocation method according to the present invention. This embodiment is executed by a task allocation apparatus that can be integrated in a network-on-chip formed by a multi-core processor, and the apparatus may be, for example, any processor and the like in the network-on-chip. This embodiment is applicable to a scenario in which the number of idle processor core resources in the network-on-chip is equal to or greater than the number of processor cores required by a to-be-processed task. Specifically, this embodiment includes the following steps:

101: Determine the number of threads included in a to-be-processed task.

The task allocation apparatus determines the number of the threads included in the to-be-processed task. Generally, the number of threads included in one task is in one-to-one correspondence with the number of processor cores required to process the task. For example, if one task includes 9 threads, 9 processor cores are required to process the task.

102: Determine, in a network-on-chip formed by a multi-core processor, multiple continuous idle processor cores whose number is equal to the number of the threads, where each of the idle processor cores is connected to one router-on-chip.

The network-on-chip has characteristics of supporting simultaneous access, high reliability, high reusability, and the like, and is formed by multiple processor cores, routers-on-chip, and interconnections (channels). The interconnections include an internal interconnection between a router-on-chip and a processor core and an external interconnection between routers-on-chip; each processor core is connected to one router-on-chip, and the routers-on-chip are interconnected to form a mesh topology (Mesh Topology, mesh for short). In this step, after the number of the threads included in the to-be-processed task is determined, the task allocation apparatus determines, in the network-on-chip formed by the multi-core processor and according to the number of the threads, the multiple continuous idle processor cores whose number is equal to the number of the threads, and corresponding routers-on-chip.

103: If an area formed by the determined routers-on-chip connected to the idle processor cores is a non-rectangular area, search for and determine, in the network-on-chip, a rectangular area extended from the non-rectangular area.

After the task allocation apparatus determines the multiple continuous idle processor cores whose number is equal to the number of the threads, if the area formed by the routers-on-chip connected to the idle processor cores is a rectangular area, the task allocation apparatus directly allocates the threads included in the to-be-processed task to the idle processor cores, where each of the processor cores is allocated one thread; otherwise, if the area formed by the routers-on-chip connected to the idle processor cores is a non-rectangular area, the task allocation apparatus searches for and determines the rectangular area extended from the non-rectangular area, where the area is a smallest rectangular area including the non-rectangular area in the network-on-chip. For example, one NoC is in a 5×5 mesh structure, the number of threads included in the to-be-processed task is 5, and if the determined continuous idle processor cores are 5 processor cores in a same column or in a same row, the 5 threads included in the to-be-processed task are allocated to the 5 continuous idle processor cores, and each of the processor cores are allocated one thread; if the number of the determined continuous idle processor cores is 5, but an area formed by routers-on-chip connected to the 5 processor cores is a non-rectangular area, that is, the formed area is an area in an irregular shape, the task allocation apparatus determines a rectangular area including the non-rectangular area, that is, a non-idle processor core to which a task has been allocated and the idle processor cores in the non-rectangular area form the rectangular area. Specifically, by using an example in which the 5 processor cores are formed by the former 3 processor cores in the first row and the former 2 processor cores in the second row, a router-on-chip connected to the third processor core in the second row is used as an edge router-on-chip, and the task allocation apparatus determines a rectangular area formed by routers-on-chip connected to the 5 processor cores, and the edge router-on-chip.

It should be noted that the present invention is described in detail in the foregoing by using an example in which the 5 processor cores is formed by the former 3 processor cores in the first row and the former 2 processor cores in the second row; however, the present invention is not limited thereto; in other possible implementation manners, the continuous idle processor cores may have different combinations, the non-rectangular area formed by the routers-on-chip connected to the processor cores also has multiple possible shapes, such as an L shape, an E shape, an F shape, a 90-degree-inverted H shape, and an I shape, and correspondingly, the rectangular area including the non-rectangular area also has multiple possible shapes.

104: If traffic of each router-on-chip that is connected to the non-idle processor core and in the extended rectangular area does not exceed a preset threshold, allocate the threads of the to-be-processed task to the idle processor cores, where each of the idle processor cores is allocated one thread.

In the rectangular area, a routing mechanism of a packet from a source router-on-chip to a destination router-on-chip does not need to be determined by using a routing table, and the packet is transmitted in an XY routing manner, that is, after the source router-on-chip and a destination router-on-chip are determined, starting from the source router-on-chip, the packet is first horizontally transmitted to an intermediate router-on-chip intersecting with a column in which the destination router-on-chip is located, and then is vertically transmitted to the destination router-on-chip; or, the packet is first vertically transmitted to an intermediate router-on-chip intersecting with a row in which the destination router-on-chip is located, and then is horizontally transmitted to the destination router-on-chip.

After the rectangular area including the non-rectangular area is determined, the task allocation apparatus predicts, according to historical traffic information of the router-on-chip that is connected to the non-idle processor core and in the rectangular area, to obtain the predicted traffic, and determines whether the predicted traffic exceeds the preset threshold; and if the predicted traffic does not exceed the preset threshold, the task allocation apparatus allocates the threads included in the to-be-processed task to the idle processor cores respectively.

According to the task allocation method provided in this embodiment of the present invention, the number of threads included in a to-be-processed task is determined; a non-rectangular area formed by multiple idle processor cores whose number is equal to the number of the required threads is determined in a network-on-chip, and an edge router in an area adjacent to the non-rectangular area and a router-on-chip in the non-rectangular area form a regular rectangular area; a router-on-chip that is connected to a non-idle processor core and is in the rectangular area is then determined, that is, whether traffic of the edge router-on-chip exceeds a preset threshold; and if the traffic of the edge router-on-chip does not exceed the preset threshold, the to-be-processed task is allocated to a processor core in an idle area. According to the task allocation method provided in this embodiment of the present invention, when the number of idle processor core resources in the network-on-chip is equal to or greater than the number of processor cores required by the to-be-processed task, if there is no regular rectangular area to which the to-be-processed task is allocated, the non-rectangular area is extended to the regular rectangular area by using the edge router and the threads of the to-be-processed task are allocated; in the rectangular area, a routing mechanism of a packet from a source router-on-chip to a destination router-on-chip does not need to be determined by using a routing table, and the packet is transmitted in an XY routing manner, thereby avoiding problems that hardware overheads are large, a network throughput is low, and system utilization is low in another task allocation method.

As can be known from the foregoing, the NoC is formed by a router-on-chip and interconnections (channels), each processor core is connected to one router-on-chip, and the number of threads included in one task is in one-to-one correspondence with the number of processor cores required to process the task. Therefore, the number of threads included in a to-be-processed task, the number of processor cores required by the to-be-processed task, and the number of the routers-on-chip connected to the required processor cores are equal, and a state of the processor core is consistent with a state of the router-on-chip: be simultaneously in an idle state or in a state in which a task is allocated; and when an idle router-on-chip is found by searching, an idle processor core is found by searching. In order to make this embodiment of the present invention clearer, networks-on-chip shown in the following views merely show routers-on-chip.

Generally, a network-on-chip includes multiple processor cores arranged in a row-column manner, such as a 5×5 network-on-chip including 25 processor cores and 25 routers-on-chip in 5 rows and 5 columns. In this way, when multiple continuous idle processor cores whose number matches the number of the threads are determined, the idle processor cores may be searched for by rows or the idle processor cores may be searched for by columns. By using searching by rows as an example, specifically, an initial idle processor core may be determined in the network-on-chip formed by the multi-core processor, and whether the multiple continuous idle processor cores whose number matches the number of the threads exist is successively determined along an adjacent router-on-chip in a same row of a router-on-chip connected to the initial idle processor core; if the number of determined continuous processor cores included in a first idle area and successively determined along an adjacent router-on-chip in a same row does not match the number of the threads, a continuous second idle area is successively determined along an adjacent router-on-chip in the same column of the router-on-chip connected to the initial idle processor, so that a sum of the number of the processor cores included in the first idle area and the number of the processor cores included in the second idle area matches the number of the threads. The present invention is described in detail in the following by using some embodiments of specifically allocating a task in a network-on-chip.

Figure 3:
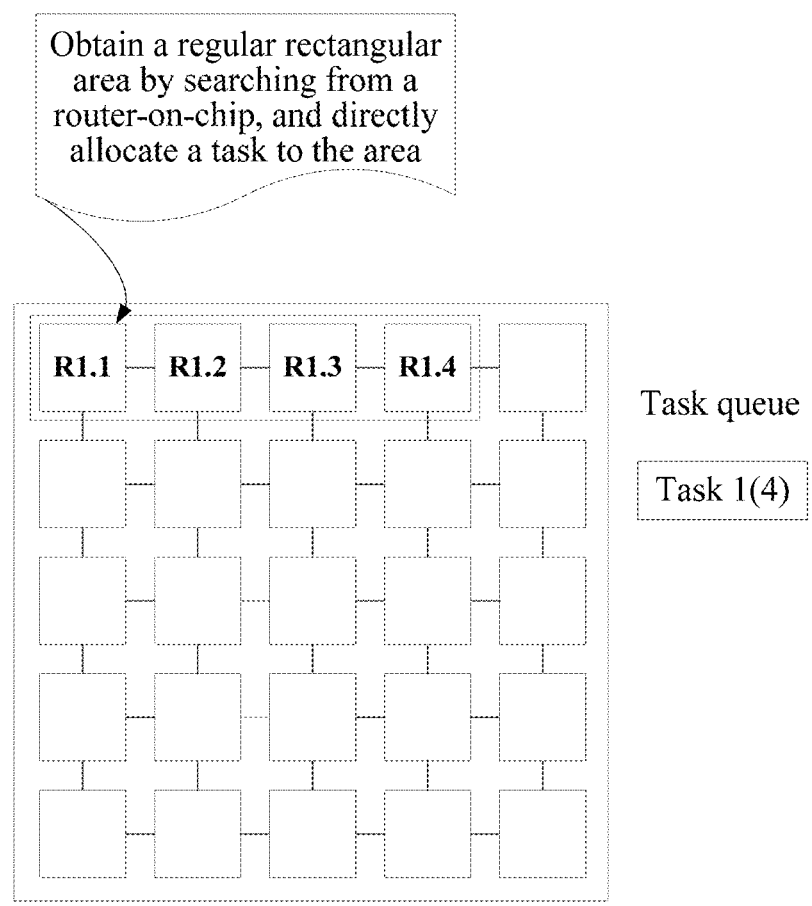
FIG. 3 is a schematic diagram of a network-on-chip in Embodiment 2 of a task allocation method according to the present invention.

FIG. 3 is a schematic diagram of a network-on-chip in Embodiment 2 of a task allocation method according to the present invention. As shown in FIG. 3, in this embodiment, an NoC is a 5×5 NoC, multiple processor cores are arranged in a row-column manner, there is a to-be-processed task 1(4) in a task queue, indicating that a task 1 includes 4 threads, and 4 processor cores need to be allocated to process the task. A processor core connected to a router-on-chip R1.1 is randomly determined as an initial idle processor core, 4 continuous idle routers-on-chip are successively determined along an adjacent router-on-chip in a same row of the router-on-chip connected to R1.1, that is, 4 routers-on-chip in total are determined, and are R1.1, R1.2, R1.3, R1.4, the 4 routers-on-chip form a first idle area which is a regular rectangular area, and then, the 4 threads included in the task 1 are directly allocated to processor cores in the rectangular area in which R1.1, R1.2, R1.3, R1.4 are located.

Figure 4A:
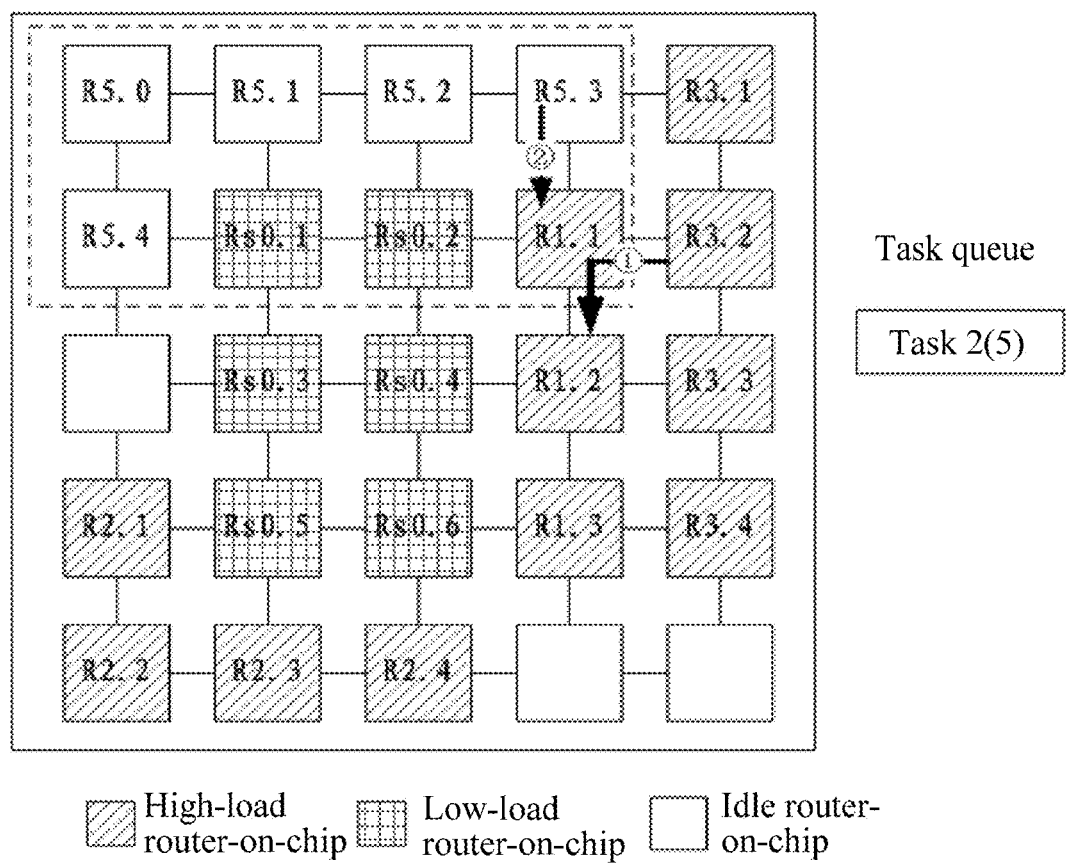
FIG. 4A is a schematic diagram of a network-on-chip in Embodiment 3 of a task allocation method according to the present invention.

FIG. 4A is a schematic diagram of a network-on-chip in Embodiment 3 of a task allocation method according to the present invention. As shown in FIG. 4A, in this embodiment, an NoC is a 5×5 NoC, multiple processor cores are arranged in a row-column manner,  indicates a high-load router-on-chip,  indicates a low-load router-on-chip, and  indicates an idle router-on-chip, that is, R1.1 to R1.3, R2.1 to R2.4, and R3.1 to R3.4 are high-load routers-on-chip, Rs0.1 to Rs0.6 are low-load routers-on-chip, and others are idle routers. Specifically, a manner of determining load of the router-on-chip can be set as required, for example, when traffic borne by a router-on-chip is greater than a preset threshold, the router-on-chip is determined as a high-load router-on-chip.

In this embodiment, there is a to-be-processed task 2(5) in a task queue, indicating the task 2 includes 5 threads, and 5 processor cores need to be allocated to process the task. A processor core connected to a router-on-chip R5.0 is randomly determined as an initial idle processor core, and continuous idle routers-on-chip are searched for from R5.0 and whether the continuous idle routers-on-chip can form a rectangular area is determined; if an eligible regular rectangular area is not found after various possible situations are traversed by rows or by columns, searching is continuously performed by rows or by columns. Specifically, if searching is performed by rows, a first idle area is searched from R5.0, that is, it is found, by searching a first idle area including 4 idle routers-on-chip in total, which are R5.0, R5.1, R5.2, and R5.3, along the first row in which R5.0 is located, that the number of processor cores does not match the number of threads, that is, the number of the processor cores included in the first idle area does not meet the number of processor cores required by the task; in this case, a second idle area is continuously searched from a column in which R5.0 is located, and when a sum of the number of processor cores in the second idle area and the number of processor cores included in the first idle area is equal to 5, that is, after R5.4 is found by searching in the second idle area, the number of the idle routers-on-chip is equal to the number of the threads, and R5.0 to R5.4, Rs0.1, Rs0.2, and the high-load router-on-chip R1.1 form a regular rectangular area.

After one regular rectangular area is determined by using the first idle area and the second idle area in the foregoing, whether traffic of a router-on-chip that is connected to a non-idle processor core and in the rectangular area exceeds the preset threshold is determined. Specifically, traffic of the router-on-chip that is connected to the non-idle processor core and in the rectangular area may be predicted according to historical traffic information of the router-on-chip that is connected to the non-idle processor core and in the rectangular area. In this embodiment, whether traffic of Rs0.1, Rs0.2, and the high-load router-on-chip R1.1 exceeds the preset threshold needs to be determined. By using R1.1 as an example, if the task 2 is allocated to the regular rectangular area that is determined by using the first idle area and the second idle area, if a sum of traffic that is originally borne by R1.1 and is shown by using a bold black arrow ① in the drawing and traffic that is added after the task 2 is allocated and is shown by using a bold black arrow ② in the drawing does not exceed the preset threshold, it is considered that R1.1 can be shared, and it is further determined that the task 2 may be allocated to the processor core included in the rectangular area, as shown in a dashed box in the drawing; in this case, a packet is in the rectangular area, and is transmitted in an XY routing manner. For example, if R5.2 is a source router-on-chip, and a destination router-on-chip is R5.4; in this case, by using XY routing, the packet may be transmitted from R5.2 to R5.4 by passing through R5.2, R5.1, and R5.0, or may be transmitted from R5.2 to R5.4 by passing through Rs0.2 and Rs0.1; otherwise, if the task 2 is allocated to the regular rectangular area that is determined by using the first idle area and the second idle area, the sum of the traffic originally borne by R1.1 and the traffic added after the task 2 is allocated exceeds the preset threshold, it is considered that R1.1 cannot be shared, and it is further determined that the task 2 cannot be allocated to the processor core included by the rectangular area.

Figure 4B:
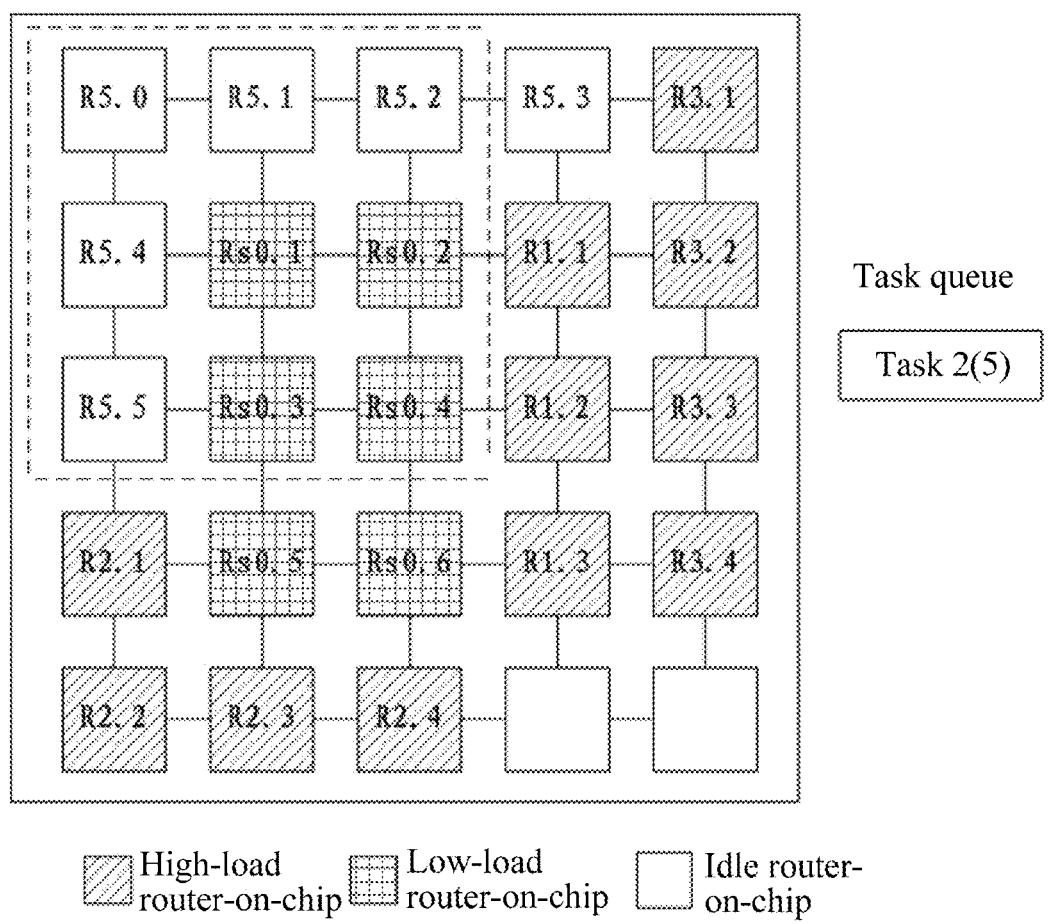
FIG. 4B is a schematic diagram of searching a rectangular area again in FIG. 4A.

After the traffic borne by the router-on-chip is determined in the foregoing, it is assumed that traffic borne by at least one of the 3 routers-on-chip exceeds the preset threshold, and it is assumed that the traffic borne by R1.1 exceeds the preset threshold. In this case, searching is performed again from R5.0 by rows or by columns. Specifically, as shown in FIG. 4B, FIG. 4B is a schematic diagram of searching a rectangular area again in FIG. 4A.

If searching is performed by columns, a third idle area is searched from R5.0, that is, it is found by searching a third idle area including 3 idle routers-on-chip in total, which are R5.0, R5.4, and R5.5, along the first row in which R5.0 is located that the number of processor cores does not match the number of threads, that is, the number of processor cores included in the third idle area does not meet the number of processor cores required by the task; in this case, a fourth idle area is continuously searched from a row in which R5.0 is located, and when a sum of the number of processor cores in the fourth idle area and the number of the processor cores included in the third idle area is equal to 5, that is, after R5.1 and R5.2 are found by searching in the fourth idle area, the number of the idle routers-on-chip is equal to the number of the threads, and R5.0, R5.4, R5.5, R5.1, R5.2, and the four low-load routers-on-chip Rs0.1, Rs0.2, Rs0.3, and Rs0.4 in the second row and in the third row form a regular rectangular area. In this case, after the task 2 is allocated to the regular rectangular area that is determined by using the third idle area and the fourth idle area, a sum of traffic originally borne by the shared Rs0.1, Rs0.2, Rs0.3, and Rs0.4 and traffic added after the task 2 is allocated does not exceed the preset threshold; if traffic of the each of the four shared routers-on-chip does not exceed the preset threshold, the task 2 is allocated to a processor core included in the rectangular area, as shown in a dashed box in FIG. 4B; otherwise, if the traffic borne by one of the four shared routers-on-chip exceeds the preset threshold, it indicates that the task 2 cannot be allocated to the rectangular area, and a processor core needs to be searched for again.

In the foregoing embodiment, if traffic prediction cannot succeed in all irregular areas, the task 2 is kept in the waiting queue to wait for a next task scheduling. For example, the processor core required by a task is searched for again after more processor cores are released after other tasks are processed.

It should be noted that, in the foregoing embodiment, the first idle area, the second idle area, the third idle area, and the fourth idle area may be regular rectangular areas, or may be irregular rectangular areas. For example, by using FIG. 4A as an example, when Rs0.1 also is an idle router-on-chip, the continuous idle routers-on-chip found by searching from R5.0 include R5.0, R5.1, the 5.2, R5.4, and Rs0.1; if Rs0.2 is an idle router-on-chip, and R5.4, Rs0.1, and R1.1 are non-idle routers-on-chip, the continuous idle routers-on-chip found by searching from R5.0 include R5.0, R5.1, R5.2, Rs0.2, and R5.3.

In order to clearly compare beneficial effects of the task allocation method of the present invention with beneficial effects of a task allocation method based on a routing subnet in the prior art, the technical solutions of the present invention and existing technical solutions are analyzed by using different traffic models.

Figure 5A:
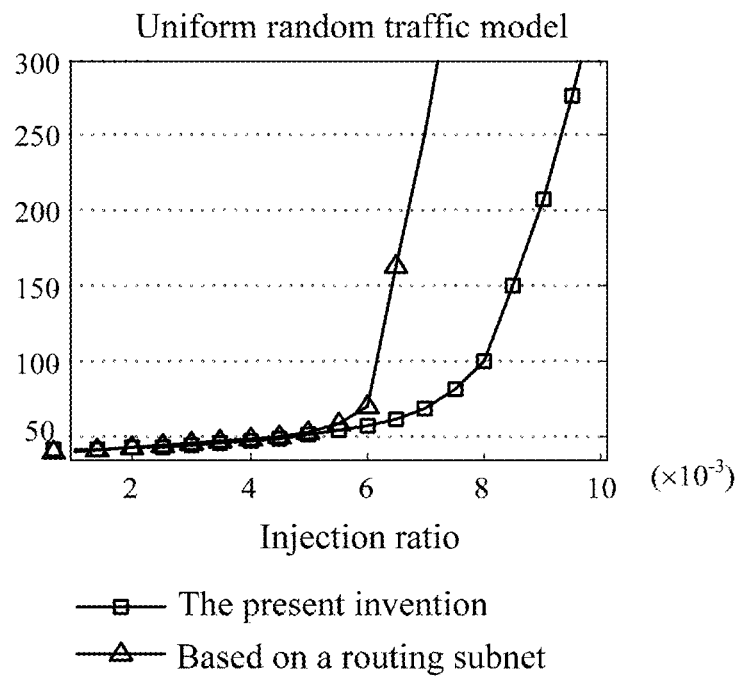
FIG. 5A is a schematic diagram of analyzing, by using a uniform random traffic model, a task allocation method of the present invention and a task allocation method based on a routing subnet.

FIG. 5A is a schematic diagram of analyzing, by using a uniform random traffic model, a task allocation method of the present invention and a task allocation method based on a routing subnet. As shown in FIG. 5A, in the uniform random traffic model (Uniform), the horizontal coordinate is an injection ratio, and may be understood as utilization of a processor core of a network-on-chip; the vertical coordinate is delay duration; ─☐─ indicates a corresponding curve of an injection ratio and delay duration in the present invention, ─△─ ─△─ indicates a corresponding curve of an injection ratio and delay duration in task allocation method based on a routing subnet.

As shown in FIG. 5A, when the injection ratio is 0 to $6 \times 10^{-3}$, utilization of the processor core of the whole network-on-chip is not high; in this way, delay duration of the technical solutions of the present invention is basically equal to the delay duration of the existing technical solutions. However, as the utilization of the processor core becomes higher, a difference that is between the technical solutions of the present invention and the existing technical solutions and corresponds to a same delay duration becomes larger; in the task allocation method based on a routing subnet, a larger injection ratio correspondingly indicates a greater delay duration, which indicates poorer performance of the network-on-chip, that is, a delay increases obviously, and a network throughput is low; however, in the task allocation method of the present invention, a larger injection ratio leads to a relatively slow increase of delay duration, which indicates good performance of the network-on-chip, that is, a delay does not increase obviously, and a network throughput is high.

Figure 5B:
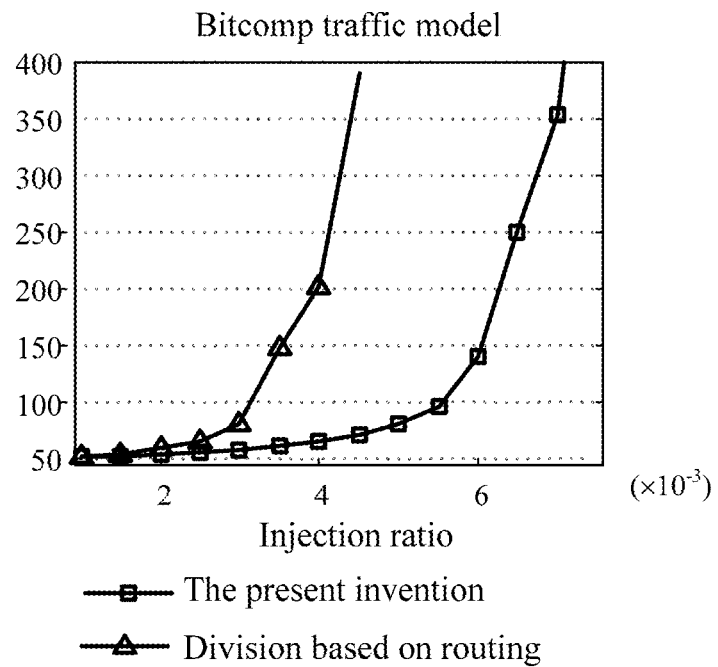
FIG. 5B is a schematic diagram of analyzing, by using a bitcomp traffic model, a task allocation method of the present invention and a task allocation method based on a routing subnet.

FIG. 5B is a schematic diagram of analyzing, by using a bitcomp traffic model, a task allocation method of the present invention and a task allocation method based on a routing subnet. Similarly, as shown in FIG. 5A, in the bitcomp traffic (Bitcomp) traffic model shown in FIG. 5B, the horizontal coordinate is an injection ratio, and may be understood as utilization of a processor core of a network-on-chip; the vertical coordinate is delay duration; ─☐─ indicates a corresponding curve of an injection ratio and delay duration in the present invention, ─△─ ─△─ indicates a corresponding curve of an injection ratio and delay duration in task allocation method based on a routing subnet. When the injection ratio is greater than $2 \times 10^{-3}$, the beneficial effects of the present invention can be obviously manifested.

Figure 5C:
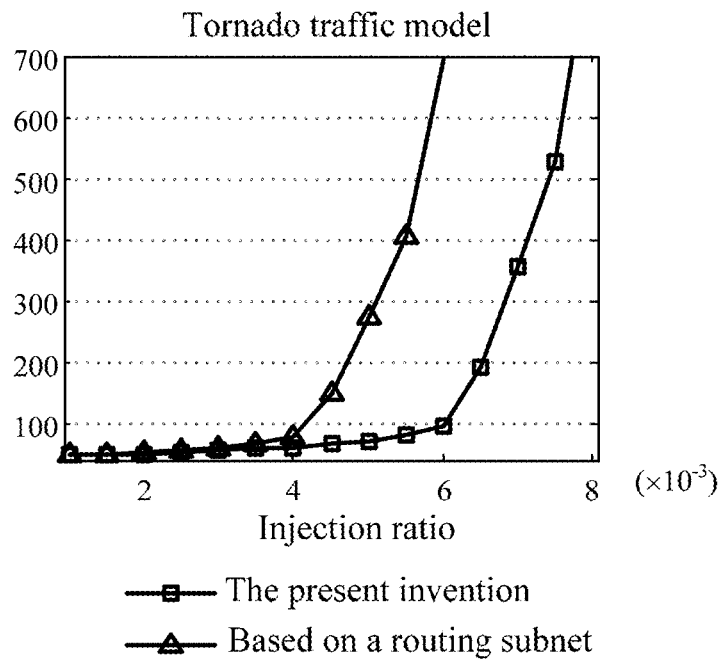
FIG. 5C is a schematic diagram of analyzing, by using a tornado traffic model, a task allocation method of the present invention and a task allocation method based on a routing subnet.

FIG. 5C is a schematic diagram of analyzing, by using a tornado traffic model, a task allocation method of the present invention and a task allocation method based on a routing subnet. Similarly, as shown in FIG. 5A, in the tornado (Tornado) traffic model shown in FIG. 5C, the horizontal coordinate is an injection ratio, and may be understood as utilization of a processor core of a network-on-chip; the vertical coordinate is delay duration; ─☐─ indicates a corresponding curve of an injection ratio and delay duration in the present invention, ─△─ indicates a corresponding curve of an injection ratio and delay duration in task allocation method based on a routing subnet. When the injection ratio is greater than $4 \times 10^{-3}$, the beneficial effects of the present invention can be obviously manifested.

In addition, in order to clearly compare the beneficial effects of the task allocation method of the present invention and beneficial effects of the task allocation method based on a routing subnet in the prior art, beneficial effects of router sharing of the present invention is compared with a division method based on a subnet in the prior art by using a system utilization table.

TABLE 1

| Network load | 0.5 | 0.6 | 0.7 | 0.8 | 0.9 | 1 |
|---|---|---|---|---|---|---|
| Division of rectangular subnet | 0.478033 | 0.572979 | 0.656676 | 0.693422 | 0.701311 | 0.707254 |
| Router sharing | 0.465374 | 0.542073 | 0.626671 | 0.705102 | 0.766011 | 0.810507 |

Table 1 is a comparison table between system utilization of a rectangular subnet division method and system utilization of a router sharing method of the present invention in a case in which a network load ratio is 0.5 to 1. The network load ratio 0.5 to 1 indicates a ratio of a required processor core to a processor core that a system can actually provide, for example, the first column in Table 1 indicates: when the ratio of the required processor core to the processor core that the system can actually provide is 0.5, the system is in an unsaturated state; in this case, the system utilization based on the rectangular subnet division method is 0.478033, while the system utilization based on the router sharing method of the present invention is 0.465374, and a difference between the system utilization is small. However, as the network load increases continuously, when the network load ratio is 0.9, the system gradually becomes saturated, the system utilization based on the rectangular subnet division method is 0.701311, and the system utilization based on the router sharing method of the present invention is 0.766011; finally, when the network load reaches 100%, that is, when the system is saturated, the system utilization based on the rectangular subnet division method is 0.707254, the system utilization based on the router sharing method of the present invention is 0.810507, and a difference between the system utilization is almost 10%.

It should be noted that, in the foregoing embodiments, an idle processor core of the network-on-chip is randomly used as the initial idle processor core, and when a processor core needs to be searched for again, searching is performed from the initial idle processor core; however, the present invention is not limited thereto; in other possible implementation manners, an initial idle processor core may also be selected according to a preset rule; each time when searching is performed, the initial idle processor core may also be different. In addition, when the number of non-rectangular areas in which the continuous idle processor cores in the network-on-chip are located is greater than 1, a processor core in an area may be randomly determined as an initial idle processor core.

Figure 6:
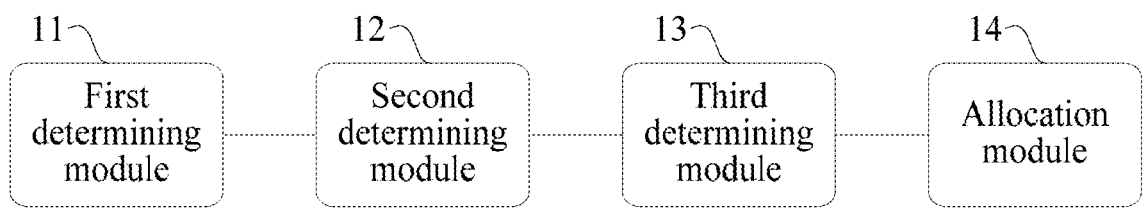
FIG. 6 is a schematic structural diagram of Embodiment 1 of a task allocation apparatus according to the present invention.

FIG. 6 is a schematic structural diagram of Embodiment 1 of a task allocation apparatus according to the present invention. As shown in FIG. 6, the task allocation apparatus provided in this embodiment specifically may implement various steps of a method that is applied to the task allocation apparatus and provided in any embodiment of the present invention, and a specific implementation process is not described herein again. The task allocation apparatus provided in this embodiment specifically includes:

a first determining module 11, configured to determine the number of threads included in a to-be-processed task;

a second determining module 12, configured to determine, in a network-on-chip formed by a multi-core processor, multiple continuous idle processor cores whose number is equal to the number of the threads, where each of the idle processor cores is connected to one router-on-chip;

a third determining module 13, configured to: when an area formed by the routers-on-chip that are determined by the second determining module 12 and connected to the idle processor cores is a non-rectangular area, search for and determine, in the network-on-chip, a rectangular area extended from the non-rectangular area; and an allocation module 14, configured to: if predicted traffic of each router-on-chip that is connected to a non-idle processor core and in the rectangular area determined by the third determining module does not exceed a preset threshold, allocate the threads of the to-be-processed task to the idle processor cores, where each of the idle processor cores is allocated one thread.

According to the task allocation apparatus provided in this embodiment of the present invention, the first determining module determines the number of threads included in a to-be-processed task; the second determining module determines, in a network-on-chip, a non-rectangular area formed by multiple idle processor cores whose number is equal to the number of the required threads, where an edge router-on-chip adjacent to the non-rectangular area and routers-on-chip that are connected to the idle processor cores and in the non-rectangular area form a regular rectangular area; then, the third determining module determines whether traffic of a router-on-chip that is connected to a non-idle processor core and in the rectangular area, that is, an edge router-on-chip, exceeds a preset threshold; and if not, the allocation module allocates the to-be-processed task to a processor core in an idle area. According to the task allocation method provided in this embodiment of the present invention, when the number of idle processor core resources in the network-on-chip is equal to or greater than the number of processor cores required by the to-be-processed task, if there is no regular rectangular area to which the to-be-processed task is allocated, the non-rectangular area forms the regular rectangular area by using the edge router and the to-be-processed task is allocated; in the rectangular area, a routing mechanism of a packet from a source router-on-chip to a destination router-on-chip does not need to be determined by using a routing table, and the packet is transmitted in an XY routing manner, thereby avoiding problems that hardware overheads are large, a network throughput is low, and a system utilization is low in a task allocation method based on a routing subnet.

Further, the third determining module 13 is specifically configured to:

determine that the rectangular area extended from the non-rectangular area is a smallest rectangular area including the non-rectangular area in the network-on-chip.

Further, the allocation module 14 is further configured to:

if the routers-on-chip that are determined by the second determining module 12 and connected to the multiple idle processor cores form a rectangular area, allocate the threads of the to-be-processed task to the idle processor cores respectively, where each of the processor cores is allocated one thread.

Further, the second determining module 12 is specifically configured to:

determine an initial idle processor core in the network-on-chip formed by the multi-core processor, where the network-on-chip includes multiple processor cores arranged in a row-column manner; and determine, in the network-on-chip formed by the multi-core processor and by using the initial idle processor core as a start point, the multiple continuous idle processor cores whose number matches the number of the threads.

Further, the second determining module 12 is specifically configured to successively determine, along an adjacent router-on-chip in a same row of a router-on-chip connected to the initial idle processor core, whether the multiple continuous idle processor cores whose number matches the number of the threads exist; and if the number of continuous processor cores, successively determined along the adjacent router-on-chip in the same row, in a first idle area does not match the number of the threads, successively determine a continuous second idle area along an adjacent router-on-chip in a same column of the router-on-chip connected to the initial idle processor, so that a sum of the number of the processor cores in the first idle area and the number of processor cores in the second idle area is equal to the number of the threads.

Further, the second determining module 12 is specifically configured to successively determine, along the adjacent router-on-chip in the same column of the router-on-chip connected to the initial idle processor core, whether the multiple continuous idle processor cores whose number matches the number of the threads exist; and if the number of continuous processor cores, successively determined along the adjacent router-on-chip in the same column, in a third idle area does not match the number of the threads, successively determine a continuous fourth idle area along an adjacent router-on-chip in the same row of the router-on-chip connected to the initial idle processor core, so that a sum of the number of the processor cores in the third idle area and the number of processor cores in the fourth idle area is equal to the number of the threads.

Figure 7:
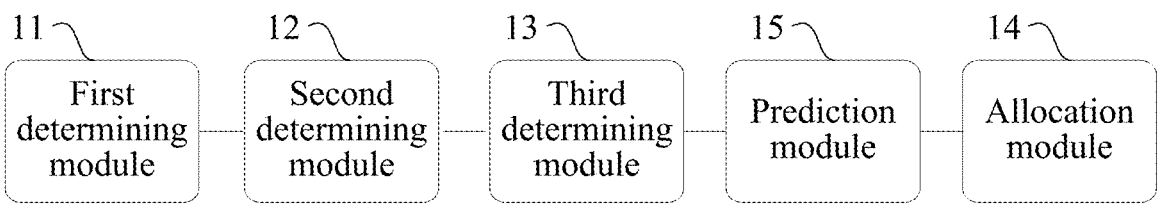
FIG. 7 is a schematic structural diagram of Embodiment 2 of a task allocation apparatus according to the present invention.

FIG. 7 is a schematic structural diagram of Embodiment 2 of a task allocation apparatus according to the present invention. As shown in FIG. 7, based on the apparatus shown in FIG. 6, the task allocation apparatus provided in this embodiment may further include:

a prediction module 15, configured to predict, according to historical traffic information of a router-on-chip that is connected to a non-idle processor core and in a rectangular area, traffic of the router-on-chip that is connected to the non-idle processor core and in the rectangular area, to obtain the predicted traffic.

Figure 8:
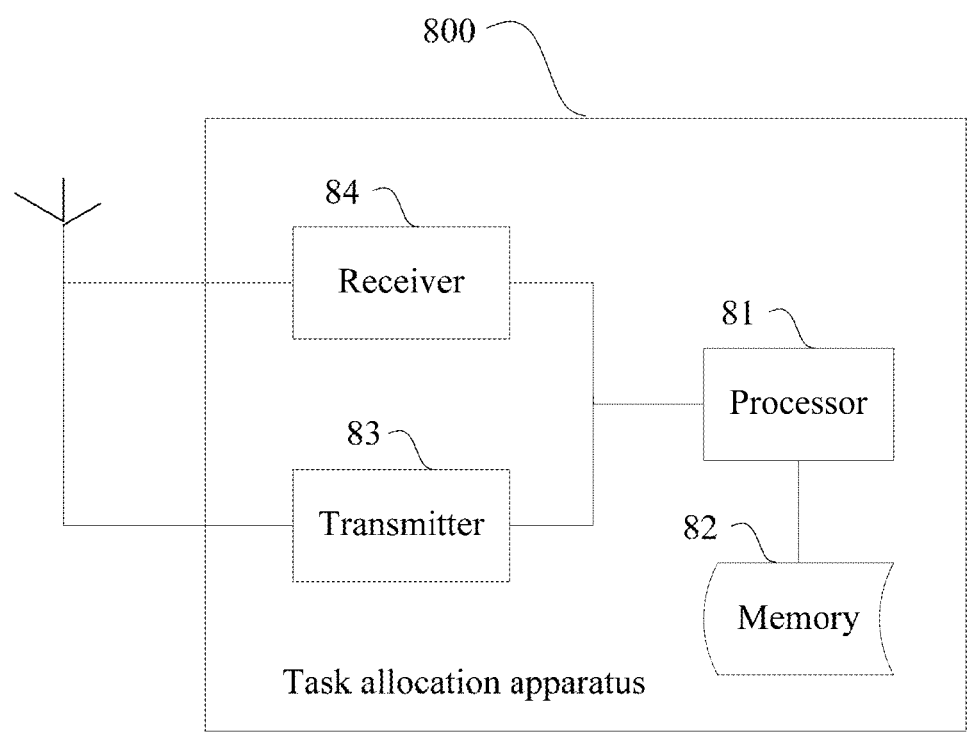
FIG. 8 is a schematic structural diagram of Embodiment 3 of a task allocation apparatus according to the present invention.

FIG. 8 is a schematic structural diagram of Embodiment 3 of a task allocation apparatus according to the present invention. As shown in FIG. 8, the task allocation apparatus 800 in this embodiment may include a processor 81 and a memory 82. The task allocation apparatus 800 may further include a transmitter 83 and a receiver 84. The transmitter 83 and the receiver 84 may be connected to the processor 81; the memory 82 stores an execution instruction; when the task allocation apparatus 800 runs, the processor 81 communicates with the memory 82; and the processor 81 invokes the execution instruction in the memory 82, to perform the following operations:

the task allocation apparatus 800 determines the number of threads included in a to-be-processed task;

determines, in a network-on-chip formed by a multi-core processor, multiple continuous idle processor cores whose number is equal to the number of the threads, where each of the idle processor cores is connected to one router-on-chip;

searches for and determines, in the network-on-chip if an area formed by the determined routers-on-chip connected to the idle processor cores is a non-rectangular area, a rectangular area extended from the non-rectangular area; and allocates the threads of the to-be-processed task to the idle processor cores if predicted traffic of each router-on-chip that is connected to a non-idle processor core and in the extended rectangular area does not exceed a preset threshold, where each of the idle processor cores is allocated one thread.

Optionally, the rectangular area extended from the non-rectangular area is a smallest rectangular area including the non-rectangular area in the network-on-chip.

Optionally, after the determining, in a network-on-chip formed by a multi-core processor, multiple continuous idle processor cores whose number matches the number of the threads, the method further includes:

if the area formed by the determined routers-on-chip of the idle processor cores is a rectangular area, allocating the threads of the to-be-processed task to the idle processor cores respectively, where each of the processor cores is allocated one thread.

Optionally, the network-on-chip includes multiple processor cores arranged in a row-column manner; and correspondingly, the determining, in a network-on-chip formed by a multi-core processor, multiple continuous idle processor cores whose number matches the number of the threads includes:

determining an initial idle processor core in the network-on-chip formed by the multi-core processor; and determining, in the network-on-chip formed by the multi-core processor and by using the initial idle processor core as a start point, the multiple continuous idle processor cores whose number matches the number of the threads.

Optionally, the searching for and determining, if an area formed by the determined routers-on-chip connected to the idle processor cores is a non-rectangular area, a rectangular area extended from the non-rectangular area includes:

successively determining, along an adjacent router-on-chip in a same row of a router-on-chip connected to the initial idle processor core, whether the multiple continuous idle processor cores whose number matches the number of the threads exist; and if the number of continuous processor cores, successively determined along the adjacent router-on-chip in the same row, in a first idle area does not match the number of the threads, successively determining a continuous second idle area along an adjacent router-on-chip in a same column of the router-on-chip connected to the initial idle processor, so that a sum of the number of the processor cores in the first idle area and the number of processor cores in the second idle area is equal to the number of the threads.

Optionally, the searching for and determining, if an area formed by the determined routers-on-chip connected to the idle processor cores is a non-rectangular area, a rectangular area extended from the non-rectangular area includes:

successively determining, along an adjacent router-on-chip in a same row of a router-on-chip connected to the initial idle processor core, whether the multiple continuous idle processor cores whose number matches the number of the threads exist; and if the number of continuous processor cores, successively determined along an adjacent router-on-chip in a same column, in a third idle area does not match the number of the threads, successively determining a continuous fourth idle area along the adjacent router-on-chip in the same row of the router-on-chip connected to the initial idle processor core, so that a sum of the number of the processor cores in the third idle area and the number of processor cores in the fourth idle area is equal to the number of the threads.

Optionally, before the allocating the threads of the to-be-processed task to the idle processor cores respectively if predicted traffic of each router-on-chip that is connected to a non-idle processor core and in the extended rectangular area does not exceed a preset threshold, the method further includes:

predicting, according to historical traffic information of the router-on-chip that is connected to the non-idle processor core and in the rectangular area, traffic of the router-on-chip that is connected to the non-idle processor core and in the rectangular area, to obtain the predicted traffic.

Based on the foregoing task allocation method and task allocation apparatus, an embodiment of the present invention further provides a network-on-chip, including multiple processor cores, routers-on-chip, and interconnections, and either task allocation apparatus shown in FIG. 6 or FIG. 7, which can correspondingly perform the technical solutions of any method embodiment in FIG. 2 to FIG. 4A, and details are not described herein again.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A task allocation method, comprising:
    determining a quantity of threads needed by a to-be-processed task;
    determining, in a multi-core processor, multiple idle processor cores equal in number to the determined quantity of threads, wherein each of the determined multiple idle processor cores is connected to a respective one of multiple routers-on-chip, wherein an area formed by the respective routers-on-chip connected to the determined multiple idle processor cores is a non-rectangular area;
    determining an extended area extended from one or more of the multiple routers-on-chip connected to the multiple idle processor cores;
    determining predicted traffic of each router-on-chip in the extended area does not exceed a preset threshold; and
    allocating the threads to the multiple idle processor cores.

2. The method according to claim 1, wherein the extended area and the non-rectangular area formed by the routers-on-chip connected to the multiple idle processor cores together form a rectangular area.

3. The method according to claim 1, wherein:
    the multi-core processor comprises multiple processor cores arranged in a row-column manner; and
    determining multiple idle processor cores comprises:
        determining an initial idle processor core in the multi-core processor, and
        determining, by using the initial idle processor core as a start point, the multiple idle processor cores.

4. The method according to claim 3, wherein determining, by using the initial idle processor core as a start point, multiple idle processor cores comprises:
    determining, in a row, continuous processor cores in a first idle area from a router-on-chip connected to the initial idle processor core; and
    determining, in a column, continuous processor cores in a second idle area from the router-on-chip connected to the initial idle processor, wherein a sum of the number of the processor cores in the first idle area and the quantity of the processor cores in the second idle area is equal to the quantity of the threads.

5. The method according to claim 3, wherein determining, by using the initial idle processor core as a start point, multiple idle processor cores comprises:
    determining, in a column, continuous processor cores in a third idle area from a router-on-chip connected to the initial idle processor core; and
    determining, in a row, continuous processor cores in a fourth idle area from the router-on-chip connected to the initial idle processor, wherein a sum of the number of the processor cores in the third idle area and the quantity of the processor cores in the fourth idle area is equal to the quantity of the threads.

6. The method according to claim 1, further comprising:
    predicting, according to historical traffic information of each router-on-chip in the extended area, traffic of each router-on-chip in the extended area, to obtain the predicted traffic.

7. A chip, comprising:
    multiple processor cores and multiple routers-on-chip, wherein each of the multiple processor cores is connected to a respective one of the multiple router-on-chip, and wherein the multiple processor cores comprise a main processor core configured to:
        determine a quantity of threads needed by a to-be-processed task;
        determine multiple idle processor cores equal in number to the quantity of the threads, wherein an area formed by the multiple routers-on-chip connected to the multiple idle processor cores is a non-rectangular area;
        determine an extended area extended from one or more of the multiple routers-on-chip connected to the multiple idle processor cores;
        determine predicted traffic of each router-on-chip in the extended area does not exceed a preset threshold; and
        allocate the threads to the multiple idle processor cores.

8. The chip according to claim 7, wherein the extended area and the non-rectangular area formed by the routers-on-chip connected to the multiple idle processor cores together form a rectangular area.

9. The chip according to claim 7, wherein:
    the multiple processor cores are arranged in a row-column manner; and
    the main processor core is configured to:
        determine an initial idle processor core in the multiple processor cores, and
        determine, by using the initial idle processor core as a start point, the multiple idle processor cores.

10. The chip according to claim 9, wherein the main processor core is configured to:
    determine, in a row, continuous processor cores in a first idle area from a router-on-chip connected to the initial idle processor core; and
    determine, in a column, continuous processor cores in a second idle area from the router-on-chip connected to the initial idle processor, wherein a sum of the number of the processor cores in the first idle area and the quantity of the processor cores in the second idle area is equal to the quantity of the threads.

11. The chip according to claim 9, wherein the main processor core is configured to:
    determine, in a column, continuous processor cores in a third idle area from a router-on-chip connected to the initial idle processor core; and
    determine, in a row, continuous processor cores in a fourth idle area from the router-on-chip connected to the initial idle processor, wherein a sum of the number of the processor cores in the third idle area and the quantity of the processor cores in the fourth idle area is equal to the quantity of the threads.

12. The chip according to claim 7, wherein the main processor core is further configured to:
    predict, according to historical traffic information of each router-on-chip in the extended area, traffic of the router-on-chip in the extended area, to obtain the predicted traffic.

13. A computing device, comprising:
a memory configured to store instructions; and
multiple processor cores, multiple routers-on-chip, wherein each of the multiple processor cores is connected to a respective one of the multiple routers-on-chip, and wherein the multiple processor cores comprise a main processor core coupled to the memory and configured to execute the instructions to:
   determine a quantity of threads needed by a to-be-processed task,
   determine multiple idle processor cores equal in number to the quantity of the threads, wherein an area formed by the multiple routers-on-chip connected to the multiple idle processor cores is a non-rectangular area,
   determine an extended area extended from one or more of the multiple routers-on-chip connected to the multiple idle processor cores,
   determine predicted traffic of each router-on-chip in the extended area does not exceed a preset threshold, and
   allocate the threads to the multiple idle processor cores.

14. The computing device according to claim 13, wherein the extended area and the non-rectangular formed by the routers-on-chip connected to the multiple idle processor cores together form a rectangular area.

15. The computing device according to claim 13, wherein:
the multiple processor cores are arranged in a row-column manner; and
wherein the main processor core is configured to:
   determine an initial idle processor core in the multiple processor cores, and
   determine, by using the initial idle processor core as a start point, the multiple idle processor cores.

16. The computing device according to claim 15, wherein the main processor core is configured to:
   determine, in a row, continuous processor cores in a first idle area from a router-on-chip connected to the initial idle processor core; and
   determine, in a column, continuous processor cores in a second idle area from the router-on-chip connected to the initial idle processor, wherein a sum of the number of the processor cores in the first idle area and the quantity of the processor cores in the second idle area is equal to the quantity of the threads.

17. The computing device according to claim 15, wherein the main processor core is configured to:
   determine, in a column, continuous processor cores in a third idle area from a router-on-chip connected to the initial idle processor core; and
   determine, in a row, continuous processor cores in a fourth idle area from the router-on-chip connected to the initial idle processor, wherein a sum of the number of the processor cores in the third idle area and the quantity of the processor cores in the fourth idle area is equal to the quantity of the threads.

18. The computing device according to claim 13, wherein the main processor core is further configured to:
   predict, according to historical traffic information of each router-on-chip in the extended area, traffic of the router-on-chip in the extended area, to obtain the predicted traffic.

* * * * *